(12) United States Patent
Misawa

(10) Patent No.: US 7,136,102 B2
(45) Date of Patent: Nov. 14, 2006

(54) DIGITAL STILL CAMERA AND METHOD OF CONTROLLING OPERATION OF SAME

(75) Inventor: Atsushi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 837 days.

(21) Appl. No.: 09/865,515

(22) Filed: May 29, 2001

(65) Prior Publication Data

US 2001/0052934 A1    Dec. 20, 2001

(30) Foreign Application Priority Data

May 30, 2000    (JP)    ............... 2000-159390
Mar. 15, 2001    (JP)    ............... 2000-073425

(51) Int. Cl.
H04N 5/222    (2006.01)
H04N 5/76    (2006.01)

(52) U.S. Cl. .................. 348/333.02; 348/231.4; 348/231.3

(58) Field of Classification Search ............. 348/231.4, 348/220.1, 231.3, 211.6, 207.99, 207.1, 207.4, 348/211.1, 207.2, 207.11; 704/275, 235, 704/270
See application file for complete search history.

(56) References Cited

U.S. PATENT DOCUMENTS

| | | | | |
|---|---|---|---|---|
| 4,764,965 A | * | 8/1988 | Yoshimura et al. | 704/278 |
| 5,231,670 A | * | 7/1993 | Goldhor et al. | 704/275 |
| 5,477,511 A | * | 12/1995 | Englehardt | 369/25.01 |
| 5,572,728 A | * | 11/1996 | Tada et al. | 707/200 |
| 5,737,491 A | * | 4/1998 | Allen et al. | 704/270 |
| 5,790,878 A | * | 8/1998 | Anderson et al. | 713/340 |
| 5,995,936 A | * | 11/1999 | Brais et al. | 704/275 |
| 6,054,990 A | * | 4/2000 | Tran | 345/863 |
| 6,111,605 A | * | 8/2000 | Suzuki | 348/220.1 |
| 6,282,154 B1 | * | 8/2001 | Webb | 704/275 |
| 6,469,738 B1 | * | 10/2002 | Hayashi | 348/231.99 |
| 2001/0037197 A1 | * | 11/2001 | Boulanov | 704/231 |
| 2002/0081112 A1 | * | 6/2002 | Morohashi et al. | 396/312 |

* cited by examiner

Primary Examiner—Lin Ye
(74) Attorney, Agent, or Firm—Birch, Stewart, Kolasch & Birch, LLP

(57) ABSTRACT

If a telop-character recording mode is selected, then, in response to depression of a shutter-release button, the image of a subject is sensed and voice enters from a microphone for a fixed period of time so that data representing voice is obtained. Character data for indicating the content of voice by characters is generated from the data representing voice. Image data representing the image of a subject, the voice data and the character data is recorded on a memory card. When an image is reproduced, the character data is combined with the image data and the characters represented by the character data are combined with the image and displayed together with the image. The content of voice can be ascertained by telop characters even with a playback device that is incapable of outputting voice.

3 Claims, 10 Drawing Sheets

DIGITAL STILL CAMERA AND METHOD OF CONTROLLING OPERATION OF SAME

BACKGROUND OF THE INVENTION

1. Field of the Invention

This invention relates to a digital still camera and to a method of controlling the operation thereof.

2. Description of the Related Art

Digital still cameras capable of recording voice data on a recording medium are now well on their way to being realized. Such digital still cameras are capable of sensing the image of a subject, recording image data representing the image of the subject on a memory card and recording voice data, which represents voice contained in sensed image of the subject, on the memory card. By reading the image data and voice data that has been recorded on the memory card from the memory card, voice represented by the voice data can be output while the image represented by the image data is being displayed.

In order to output voice, however, the device that reproduces the image must be equipped with a speaker or the like for outputting voice. In the absence of a speaker, voice cannot be output even if voice data has been recorded on the memory card.

DISCLOSURE OF THE INVENTION

Accordingly, an object of the present invention is to make it possible to ascertain the content of voice represented by voice data even if an image playback device does not having a function for outputting voice.

According to the present invention, the foregoing object is attained by providing a digital still camera having an image sensing device for sensing the image of a subject and outputting image data representing the image of the subject, and an image recording controller for recording image data, which has been output from the image sensing device, on a recording medium, the camera comprising: a voice input unit for inputting voice and outputting voice data representing voice; a voice recording controller for recording voice data, which has been output from the voice input unit, on the recording medium; a character data generating unit for generating character data representing voice represented by voice data output from the voice input unit; and a character recording controller for recording character data, which has been generated by the character data generating unit, on the recording medium.

The present invention provides also an operation control method suited to the camera described above. Specifically, the invention provides a method of controlling operation of a digital still camera having an image sensing device for sensing the image of a subject and outputting image data representing the image of the subject, and an image recording controller for recording image data, which has been output from the image sensing device, on a recording medium, the method comprising the steps of: inputting voice and obtaining voice data representing voice; recording obtained voice data on the recording medium; generating character data representing voice represented by obtained voice data; and recording generated character data on the recording medium.

In accordance with the present invention, the image of a subject is sensed and image data representing the image of the subject is recorded on a recording medium. Further, voice is input and data representing voice is recorded on the recording medium. Furthermore, character data (character codes) representing this voice is generated. The generated character data also is recorded on the recording medium.

When an image is reproduced, image data that has been recorded on the recording medium is read from the medium and an image represented by the read image data is displayed. Character data also is read from the recording medium and characters represented by the character data can be displayed on the image. Thus, the content of voice can be ascertained even with an image playback device that does not possess a function such as a voice playback function. As a result, the atmosphere represented by voice at the time the image was captured can be grasped even with an image playback device that does not possess a function such as a voice playback function.

Of course, in case of an image playback device having a voice playback function, voice data would be read from the recording medium and voice representing the read voice data would be output.

The voice input unit may be one which inputs voice during the sensing of the image of a subject by the image sensing device. In this case, the camera would further comprise a first control unit for controlling the image recording controller, the voice recording controller and the character recording controller in such a manner that at least two types of the data among the image data, voice data and character data will be recorded on the recording medium in a form linked to each other.

Thus, mutually linked data can be found immediately.

The camera may further comprise: a first reading unit for reading image data and character data that has been recorded on the recording medium; a first combining unit for combining the characters, which are represented by the character data, with an image displayed by the image data that has been read by the first reading unit; and a first display unit for displaying the image with which the characters have been combined by the first combining unit.

Thus, characters represented by the voice data can be displayed without providing an image playback device separate from the digital still camera.

The camera may further comprise a second combining unit for combining characters, which are represented by character data that has been generated by the character data generating unit, with an image output from the image sensing device; and a second control unit for controlling the image recording controller and the character recording controller in such a manner that image data representing an image with which characters have been combined by the second combining unit will be recorded on the recording medium.

The camera may further comprise: a determination unit for determining whether the digital still camera has a voice output unit when playback is performed; a second control unit, responsive to a determination by the determination unit to the effect that the camera has a voice output unit, for outputting voice, which is represented by the voice data, from the voice output unit and halting display of characters represented by the character data; and a third control unit, responsive to a determination by the determination unit to the effect that the camera does not have a voice output unit, for controlling a display unit so as to display the characters represented by the character data.

Since characters are not displayed when voice can be output, the characters will not be superimposed on an image.

The camera may further comprise a second reading unit for reading character data that has been recorded on the recording medium; a second display unit for displaying characters represented by character data that has been read by the second reading unit; and an erasure control unit responsive to an erase command for erasing voice data, which corresponds to characters being displayed on the second display unit, from the recording medium.

The content of voice corresponding to characters can be ascertained by viewing the characters. Thus a user can decide whether or not to erase voice data without listening to the voice.

The image recording controller may record image data, which has been output from the image sensing device, in response to input of predetermined voice to the voice input unit.

Thus, a command for recording image data can be applied by inputting predetermined voice.

Thus, image data representing an image with which characters have been combined can be recorded on the recording medium. Even if the image playback unit is not equipped with a circuit for combining an image and characters, an image with which characters have been combined can be displayed at the time of image playback.

The camera may further comprise a third reading unit for reading image data, which represents an image with which characters have been combined, from the recording medium; and a second display unit for displaying an image represented by image data that has been read by the third reading unit.

Thus, an image with which characters have been combined can be displayed without providing an image playback device separate from the digital still camera.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
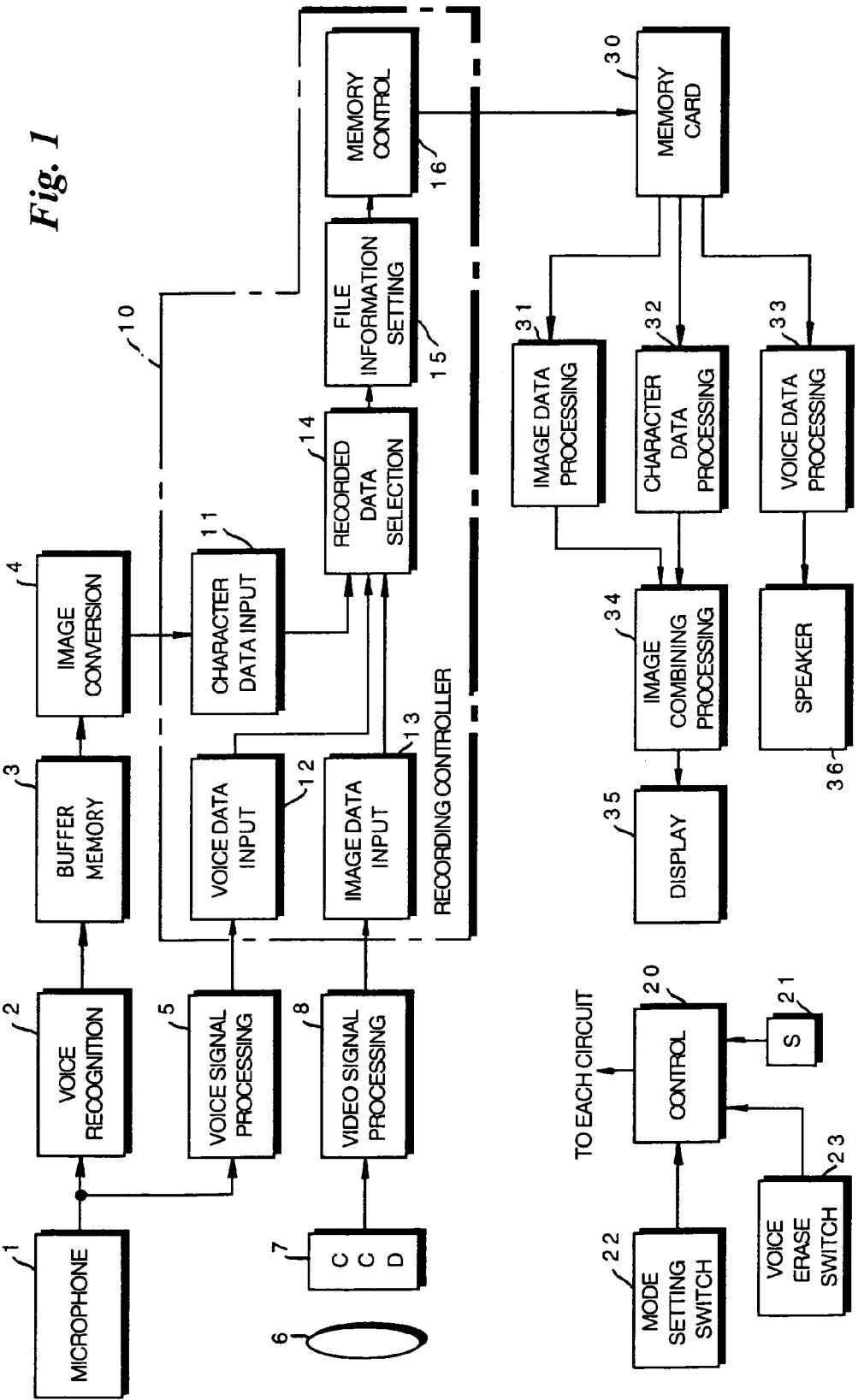
FIG. 1 is a block diagram showing the electrical construction of a digital still camera according to an embodiment of the present invention.

FIG. 1 is a block diagram showing the electrical construction of a digital still camera according to an embodiment of the present invention.

The overall operation of the digital still camera is controlled by a control circuit 20.

The digital still camera includes a shutter-release button 21 which, when pressed, applies a signal indicative thereto to the control circuit 20.

The digital still camera further includes a mode setting switch 22. The latter makes it possible to set various modes, such as an imaging mode, voice recording mode, telop (television opaque projector) recording mode and playback mode. A signal representing the set mode is input to the control circuit 20.

The digital still camera is further provided with a voice erasure function the details of which will be described later. A voice erase command from a voice erase switch 23 also is input to the control circuit 20.

In the imaging mode, the image of a subject is sensed and the shutter-release button 21 is pressed, whereby image data representing the image of the subject is recorded on a memory card 30. The voice recording mode is for recording voice data, which represents voice, on the memory card 30 together with image data. In the telop recording mode, data representing characters represented by the voice data is recorded on the memory card 30 together with the image data and voice data. The playback mode is for reproducing an image represented by the image data that has been recorded on the recording medium.

Voice is input by a microphone 1 and a voice signal representing voice is output. The voice signal is input to a voice recognition circuit 2 and voice signal processing circuit 5.

The voice recognition circuit 2 includes an analog/digital converter for converting the input analog voice signal to digital voice data. Characters representing voice input to the microphone 1 are recognized from the digital voice data obtained by the conversion. Character codes (text code) representing the recognized characters are generated in the voice recognition circuit 2. The generated character codes are applied to a buffer memory 3, where the codes are stored temporarily.

The character codes are read out of the buffer memory 3 and applied to an image conversion circuit 4. The latter subjects the character codes to image-data conversion processing for expressing, in the form of an image, the characters represented by the character codes. Data representing characters expressed in image form shall be referred to as character data.

Character data output from the image conversion circuit 4 is applied to a recorded-data selection circuit 14 via a character data input circuit 11 included in a recording controller 10.

The voice signal that has been input to the voice signal processing circuit 5 is subjected to predetermined voice signal processing such as noise removal processing. The voice signal processing circuit 5 also includes an analog/digital converter for converting the analog voice signal to digital voice data.

The digital voice data obtained by the conversion is applied to the recorded-data selection circuit 14 via a voice data input circuit 12.

The image of a subject is formed on the photoreceptor surface of a CCD 7 by an imaging lens 6. A video signal representing the image of the subject is output from the CCD 7 and input to a video signal processing circuit 8. The latter subjects the video signal to predetermined video signal processing such as gamma correction processing, color-balance adjustment processing and analog/digital signal conversion processing.

Digital image data representing the image of the subject output from the video signal processing circuit 8 is input to the recorded-data selection circuit 14 via an image data input circuit 13 included in the recording controller 10.

The recorded-data selection circuit 14 selects and outputs the applied character data, voice data or image data. The data output from the recorded-data selection circuit 14 is applied to a file information setting circuit 15, where the data is subjected to processing that generates link data for linking the voice data and image data (e.g., as by using file names that are partially identical). The data output from the file information setting circuit 15 is then recorded on the memory card 30 under the control of a memory control circuit 16.

Figure 2:
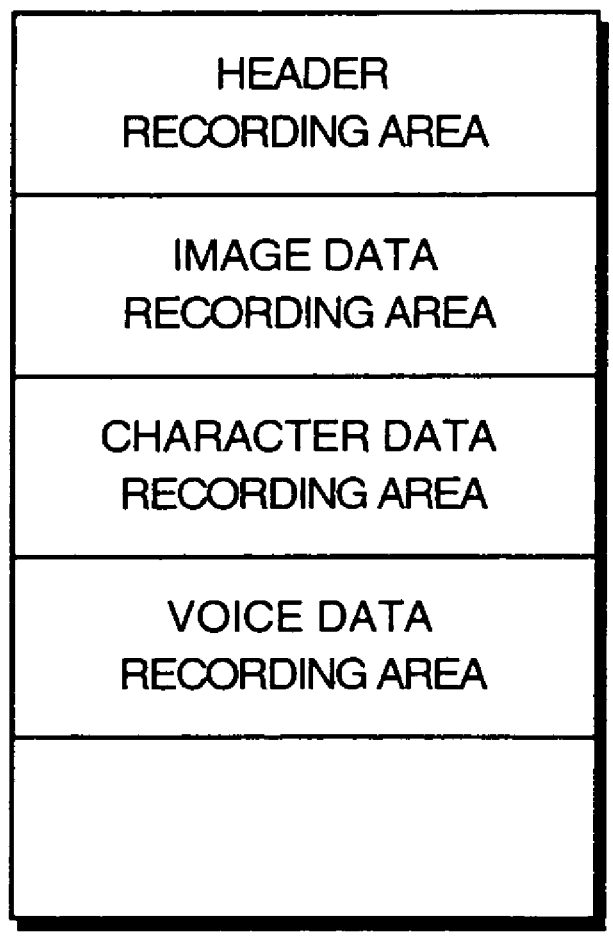
FIG. 2 is a diagram showing the data structure of a memory card according to this embodiment.

FIG. 2 illustrates the data structure of the memory card 30.

The memory card 30 includes a header recording area for recording management data, an image data recording area for recording image data, a character data recording area for recording character data and a voice data recording area for recording voice data.

Image data obtained by imaging is recorded in the image data recording area of the memory card 30 by the memory control circuit 16. Further, character data, which represents the content of voice by characters obtained based upon voice recognition processing, is recorded in the character data recording area. Furthermore, voice data is recorded in the voice data recording area.

With reference again to FIG. 1, the playback mode is such that image data that has been recorded on the memory card 30 is applied to an image data processing circuit 31, character data that has been recorded is applied to a character data processing circuit 32 and voice data that has been recorded is applied to a voice data processing circuit 33.

The image data processing circuit 31 subjects the data that has been read from the memory card 30 to predetermined image processing such as format conversion processing that is suited to a display unit 35. The character data processing circuit 32 subjects the character data to predetermined character processing such as format conversion processing suited to the display unit 35. Further, the voice data processing circuit 33 subjects the voice data to predetermined processing such as format conversion processing suited to output from a speaker 36.

The image data output from the image data processing circuit 31 and the character data output from the character data processing circuit 32 is applied to an image combining processing circuit 34. The latter subjects the image data and character data to combining processing in such a manner that characters represented by the character data will be displayed on the image represented by the image data. By applying the combined image data to the display unit 35, the image with which the characters have been combined will be displayed on the display screen of the display unit 35.

Further, by applying the voice data output from the voice data processing circuit 33 to the speaker 36, voice represented by the voice data will be output.

Figure 3:
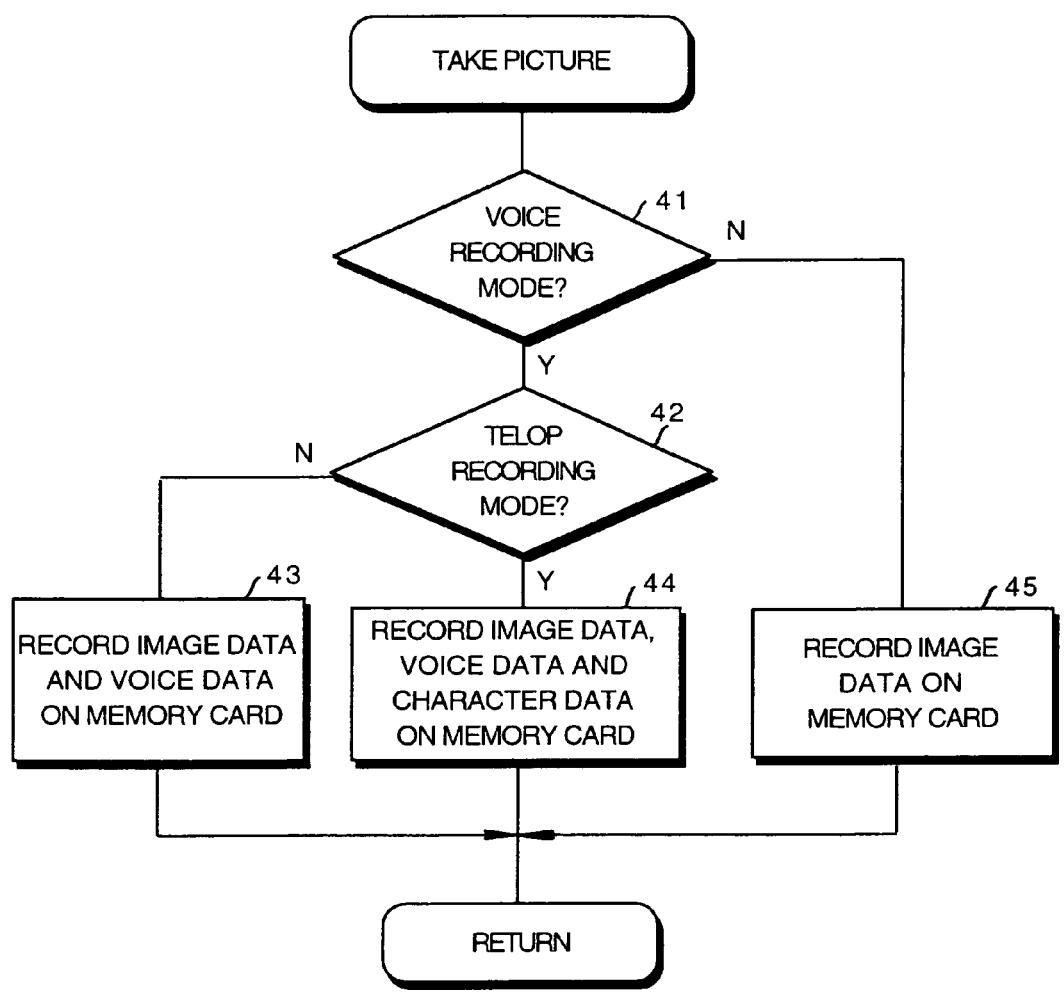
FIG. 3 is a flowchart illustrating processing executed at the time of photography according to this embodiment.

FIG. 3 is a flowchart illustrating processing executed when the digital still camera performs photography.

Whether or not the voice recording mode has been set by the mode setting switch 22 is checked (step 41). If the voice recording mode has not been set ("NO" at step 41), it is considered that the camera has been set merely to the photography mode. If the shutter-release button 21 is pressed, image data obtained as a result of imaging a subject by the CCD 7 will be recorded in the image data recording area of the memory card 30 (step 45). If the voice recording mode has not been set, then voice data is not recorded on the memory card 30.

If the voice recording mode has been set ("YES" at step 41), then whether the telop recording mode has been set is checked (step 42). If the telop recording mode has been set ("YES" at step 42), then, in response to depression of the shutter-release button 21, the image of the subject is sensed by the CCD 7 and image data representing the image of the subject is obtained and, moreover, input of voice by the microphone 1 starts. Input of voice is performed for a fixed period of time starting from depression of the shutter-release button 21.

Voice data representing voice is obtained, in the manner set forth above, from the voice signal output by the microphone 1. In the telop recording mode, character data representing characters which indicate the content of voice represented by the voice signal also is generated.

Thus, in the telop recording mode, image data representing the image of a subject, voice data representing voice and character data for representing the content of voice by characters are obtained. These items of image data, voice data and character data are selected successively by the recorded-data selection circuit 14 and recorded on the memory card 30. The obtained items of image data, voice data and character data are recorded in the image data recording area, voice data recording area and character data recording area, respectively, of the memory card 30 (step 44). It goes without saying that data indicating the corresponding relationship among the corresponding items of image data, voice data and character data is recorded in the header area of the memory card 30, as described above.

If the voice recording mode has been set but the telop recording mode has not ("NO" at step 42), voice is input by the microphone 1 but voice recognition processing by the voice recognition circuit 2 is not executed. Accordingly, character data representing characters indicative of the content of voice is not obtained. Image data representing the image of the subject is recorded in the image data recording area of memory card 30 and voice data is recorded in the voice data recording area of memory card 30 (step 43).

In the embodiment set forth above, image data or the like is recorded on the memory card 30 in response to depression of the shutter-release button 21. However, an arrangement may be adopted in which image data or the like is recorded on the memory card 30 in response to input of predetermined voice to the microphone 1. In this case, voice data representing voice that triggers recording of image data would be stored in a prescribed memory beforehand and image data would be recorded on the memory card 30 in response to a match between voice data representing entered voice and the voice data that has been stored.

Figure 4:
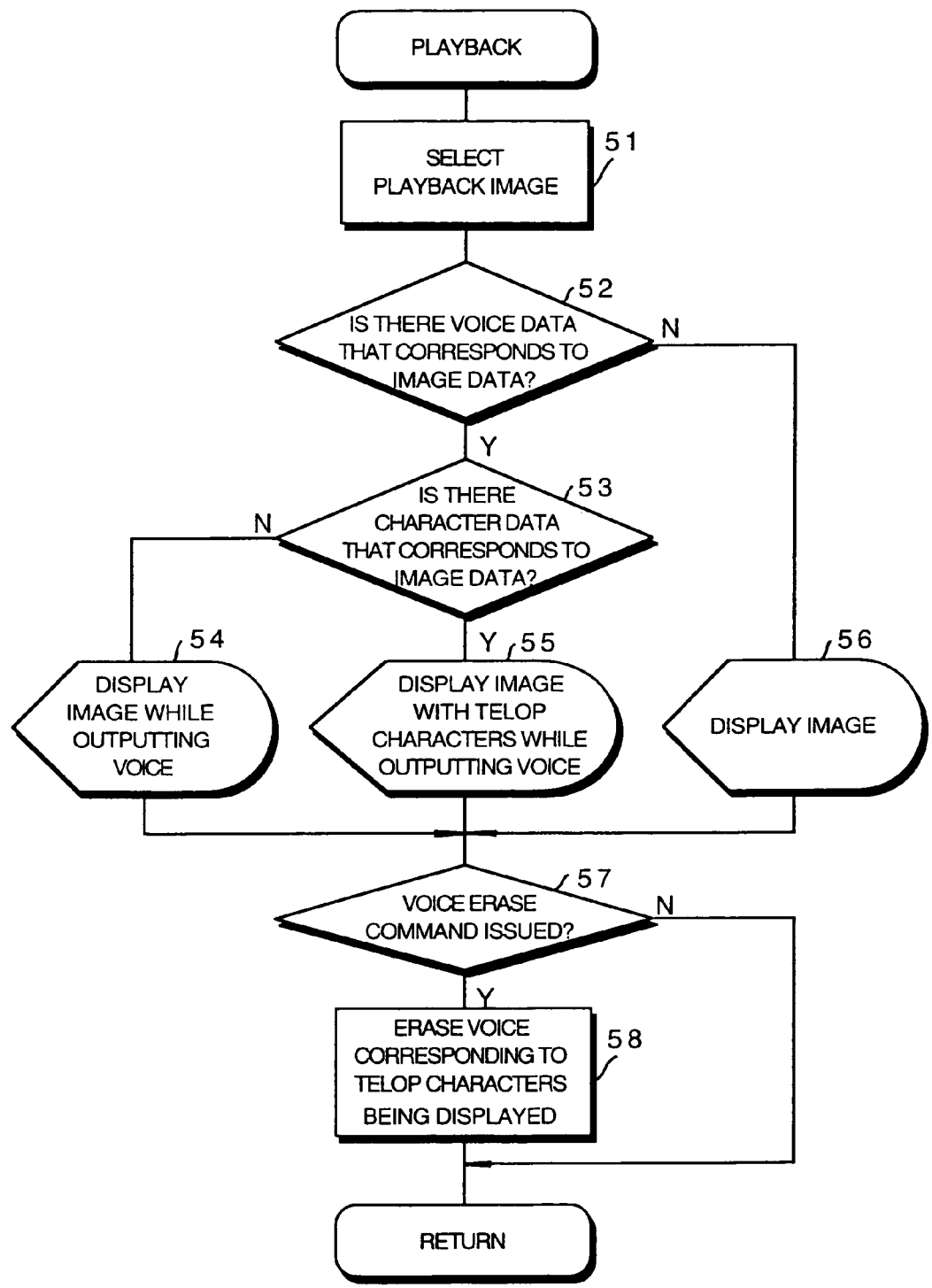
FIG. 4 is a flowchart illustrating processing executed at the time of playback according to this embodiment.

FIG. 4 is a flowchart illustrating processing executed by the digital still camera at the time of playback.

Image data is read out of the memory card 30 loaded in the digital still camera, and is given to the display unit 35 via the image data processing circuit 31 and image combining processing circuit 34. The image represented by the image data that has been read out is displayed on the display screen of the display unit 35. While observing the image displayed on the display screen of the display unit 35, the user selects an image to be reproduced [it goes without saying that the digital still camera is provided with a frame selection switch (not shown) or the like for selecting a playback image] (step 51).

On the basis of the link data that has been recorded in the header recording area of the memory card 30, it is determined whether voice data corresponding to the image data representing the selected image has been recorded in the voice data recording area of the memory card 30 (step 52).

If voice data corresponding to the selected image data has not been recorded on the memory card 30 ("NO" at step 52), then it is construed that the selected image data was captured by the simple image mode. The image represented by the selected image data is displayed on the display screen of the display unit 35 (step 56) without output of voice.

If voice data corresponding to the selected image data has been recorded on the memory card 30 ("YES" at step 52), then it is determined whether character data corresponding to the image data has been recorded on the memory card 30 (step 53).

Figure 5:
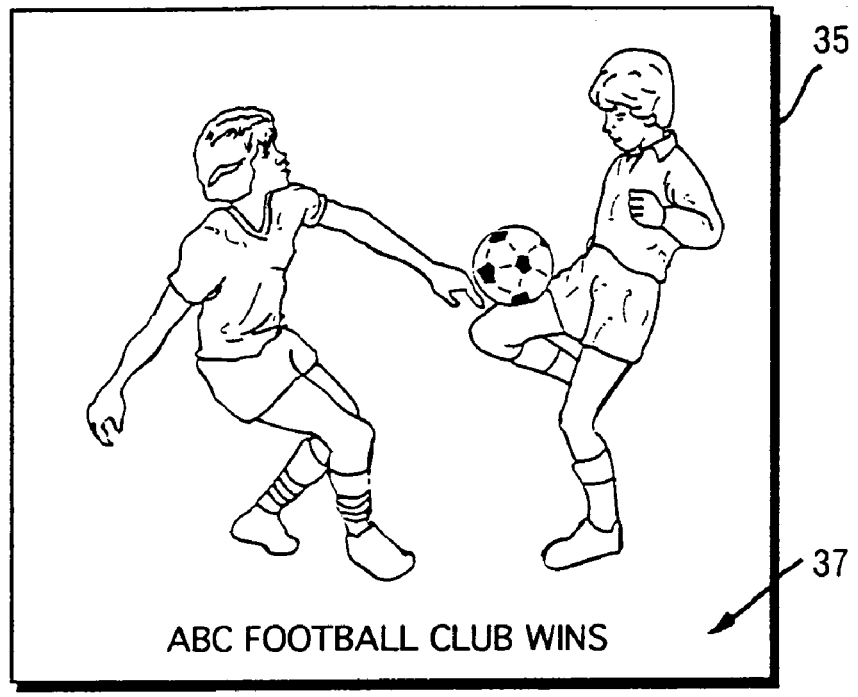
FIG. 5 shows an example of a reproduced image.

If both voice data and character data corresponding to the image data has been recorded on the memory card 30 ("YES" at both steps 52 and 53), then the voice data and character data corresponding to the selected image data is read out of the memory card 30. The items of image data, character data and voice data that have been read out are applied to the image data processing circuit 31, character data processing circuit 32 and voice data processing circuit 33, respectively. As described above, various processing is executed and the items of image data and voice data are combined in the image combining processing circuit 34. The image data with which the character data has been combined is applied to the display unit 35. As a result, an image combined with telop characters 37, which are represented by the character data, is displayed on the display screen of the display unit 35, as shown in FIG. 5. Further, voice data is applied to the speaker 36 in conformity with the display of the image so that voice conforming to the telop characters 37 is output (step 55).

If there is no character data corresponding to image data ("NO" at step 53), image data that has been read out of the memory card 30 is applied to the display unit 35 so that the image is displayed. Since there is no character data corresponding to the read image data, telop characters are not displayed. Since there is voice data corresponding to the read image data, voice represented by this voice data is output from the speaker 36 (step 54).

Furthermore, it is determined whether a voice erase command has been applied by the voice erase switch 23 (step 57). In a case where telop characters are being displayed when a voice erase command is applied ("YES" at step 57), voice data representing voice corresponding to these telop characters is erased from the memory card 30 (step 58). The content of voice can be checked by observing the telop characters. Unnecessary voice can be erased from the memory card 30 without listening to it.

In the embodiment described above, the digital still camera is provided with the speaker 36 and therefore voice represented by voice data is output. It goes without saying, however, that voice will not be output if the speaker 36 has not been provided. Since telop characters indicating the content of voice are displayed on the image even if the playback device is not provided with a speaker, it is still possible to ascertain the content of voice.

Further, in the embodiment described above, character data representing characters in the form of an image has been recorded on the memory card 30. However, character codes may be recorded on the memory card 30.

FIGS. 6 to 9 illustrate another embodiment of the present invention. According to the above-described embodiment, character data is combined with image data when an image is reproduced. With the embodiment shown in FIGS. 6 to 9, however, image data is combined with character data at the time of recording and the image data with which the character data has been combined is recorded on the memory card 30.

Figure 6:
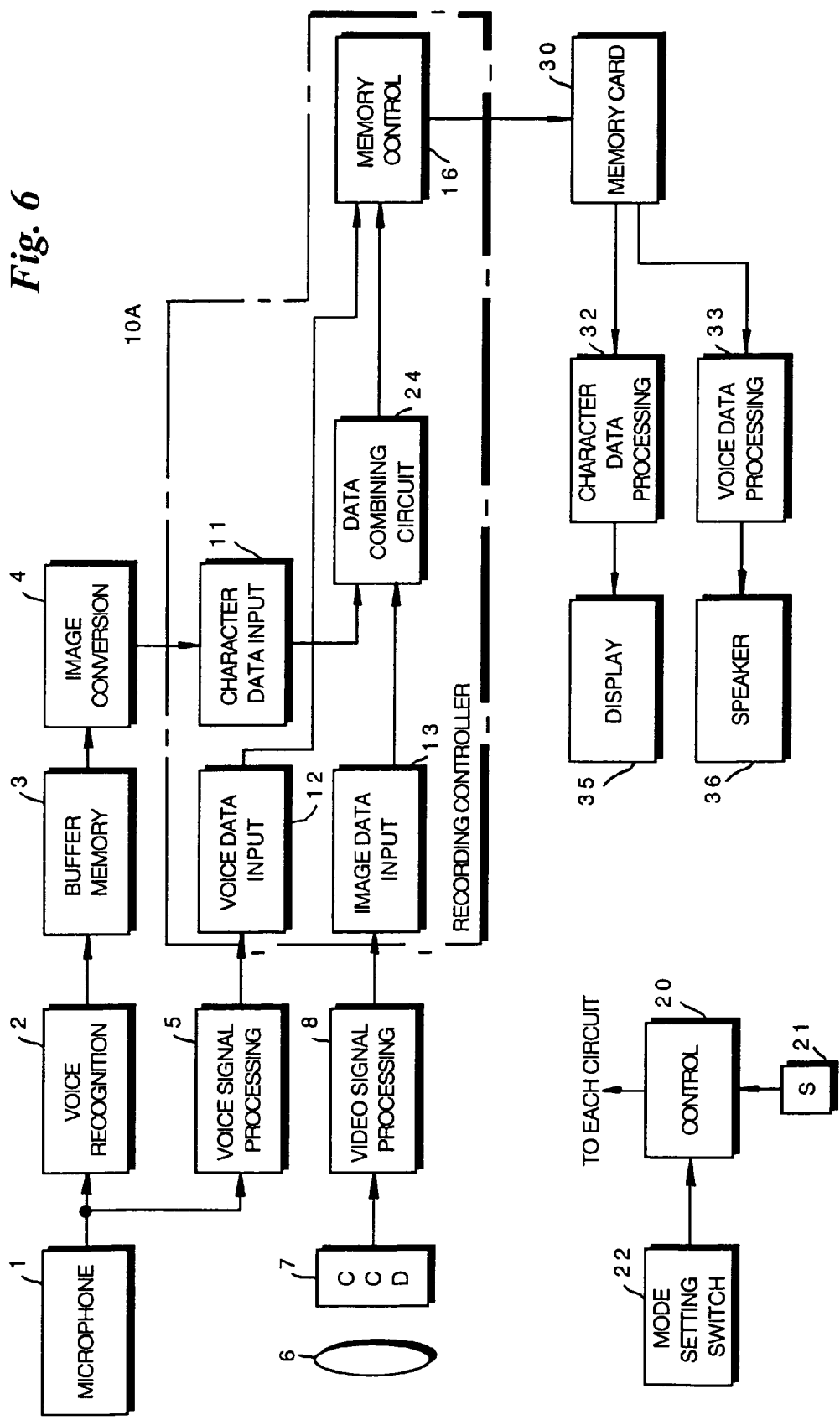
FIG. 6 is a block diagram showing the electrical construction of a digital still camera according to another embodiment of the present invention.
Figure 7:
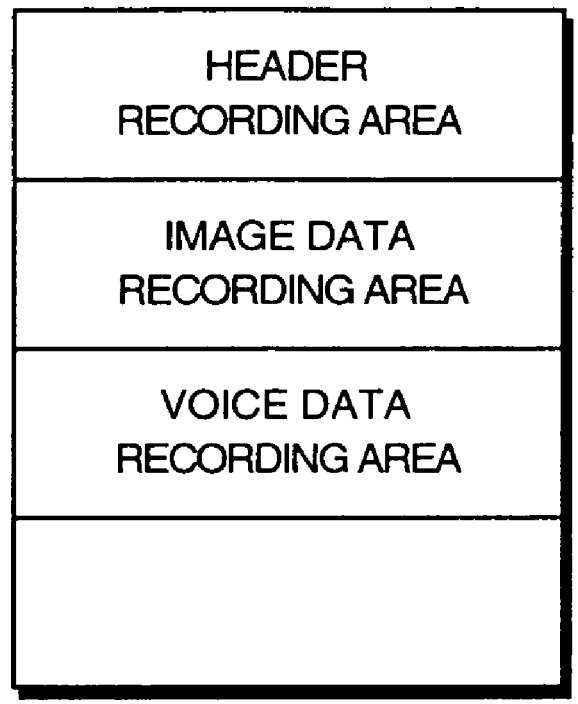
FIG. 7 is a diagram showing the data structure of a memory card according to this embodiment.

FIG. 6 is a block diagram showing the electrical construction of the digital still camera according to this embodiment. Components identical with those shown in FIG. 1 are designated by like reference characters and need not be described again. FIG. 7 illustrates the data structure of the memory card 30.

Figure 8:
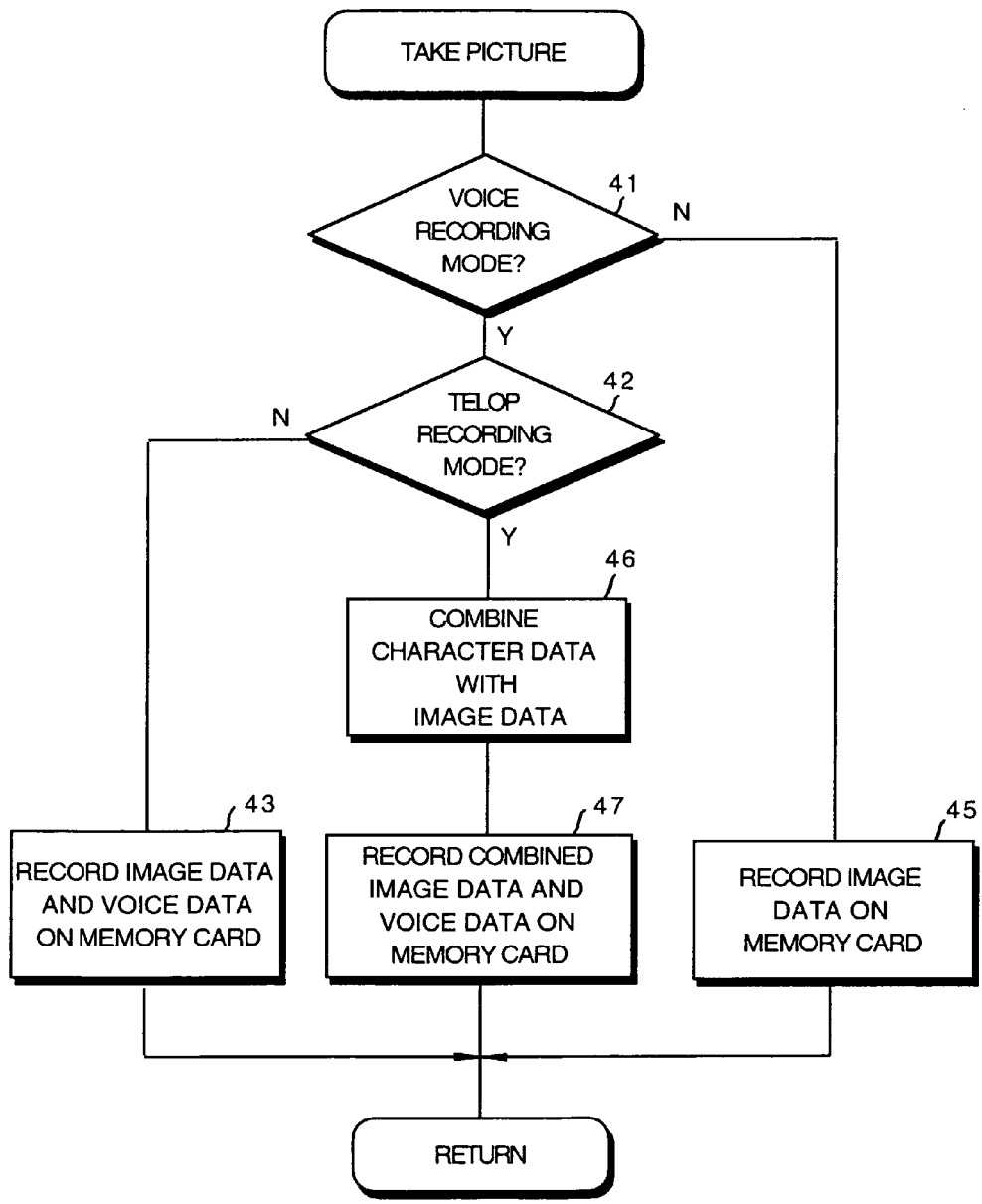
FIG. 8 is a flowchart illustrating processing executed at the time of photography according to this embodiment.
Figure 9:
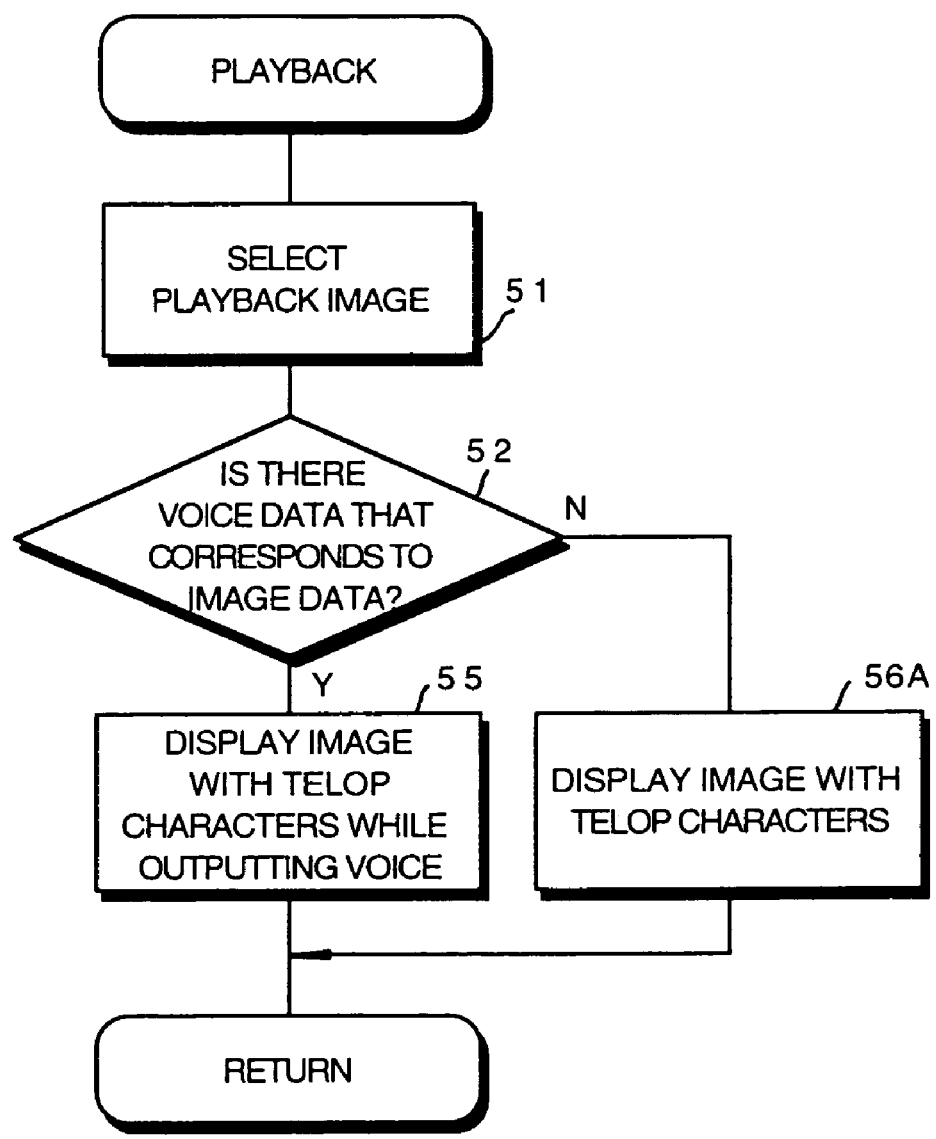
FIGS. 9 and 10 are flowcharts illustrating processing executed at the time of playback according to this embodiment.

FIG. 8 is a flowchart illustrating processing executed when photography is performed using the digital still camera performs shown in FIG. 6, and FIG. 9 is a flowchart illustrating processing executed when playback is performed using the digital still camera shown in FIG. 6. Processing steps identical with those shown in FIGS. 3 and 4 are designated by like step numbers and need not be described again.

Items of image data, voice data and character data are obtained in the telop recording mode ("YES" at step 42 in FIG. 8) in a manner similar to that of the above-described embodiment. These items of image data, voice data and character data are applied to a data combining circuit 24. The latter combines the character data with the image data, whereby there is obtained image data representing an image with which telop characters have been combined (step 46 in FIG. 8).

The memory card 30 has the header recording area, image data recording area and voice data recording area.

Image data with which the character data has been combined is recorded in the image data recording area of memory card 30. Further, voice data is recorded in the voice data recording area (step 47 in FIG. 8). Thus, voice data alone is not recorded on the memory card 30.

Image data with which character data has thus been combined is read out of the memory card 30 and applied to the display unit 35 via the character data processing circuit 32. At playback, the image with which telop characters have been combined can be displayed on the display screen of the display unit 35 (steps 55, 56A in FIG. 9) without executing processing for combining the character data with the image data. Further, it goes without saying that if voice data is present, then voice is output by applying the voice data to the speaker 36 (step 55 in FIG. 9).

This embodiment is useful when a device exclusively for playback does not have an image combining function. That is, when the playback device does not have an image combining function, telop characters cannot be combined with and displayed on an image. In this embodiment, however, image data with which telop characters have already been combined is produced in advance and recorded on the memory card 30. At playback, image combining processing is unnecessary. This means that image data with which telop characters have been combined can be displayed even with a playback device not having an image combining function.

Though each of the above-described circuits is implemented by hardware, some or all of these circuits may be implemented by software.

Figure 10:
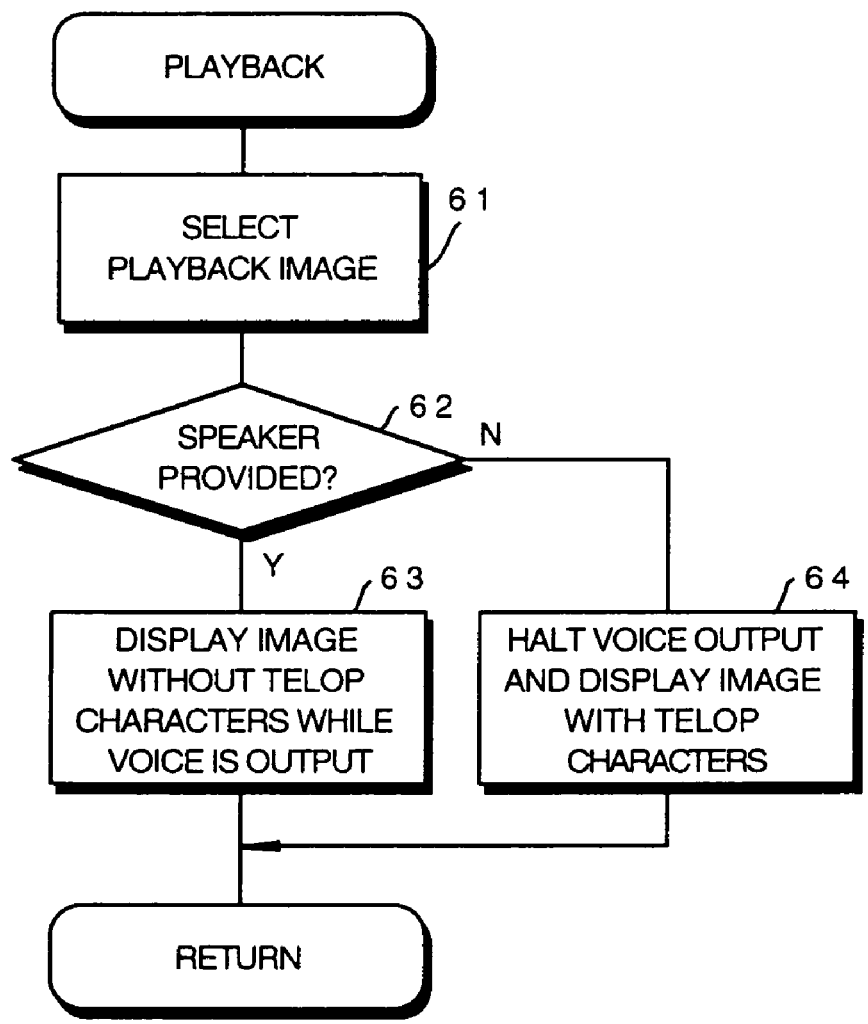

FIG. 10 is a flowchart illustrating processing executed when playback is performed by this digital still camera.

In a manner similar to that described above, a playback image is selected (step 61). It is then determined whether the digital still camera has a speaker (step 62).

If the camera has a speaker ("YES" at step 62), voice is output from the speaker and an image without telop characters is displayed (step 63). If the camera does not have a speaker ("NO" at step 62), voice output is halted and an image with telop characters is displayed (step 64). When the camera has a speaker, telop characters are not displayed. This means that telop characters will not interfere with viewing of the image.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera having an image sensing device for sensing an image of a subject and outputting image data representing the image of the subject, and an image recording controller for recording image data output from the image sensing device, on a recording medium, comprising:
   a mode selection unit for selecting a voice recording mode or a character recording mode;
   a voice input unit for inputting a voice and outputting voice data representing the voice;
   a voice recording controller for recording the voice data output from said voice input unit on the recording medium in response to a selection of the voice recording mode by said mode selection unit;
   a character data generating unit for generating character data representing the voice data output from said voice input unit;
   a character recording controller for recording the character data generated by said character data generating unit on the recording medium in response to a selection of the character recording mode by said mode selection unit;
   a determination unit for determining whether the digital still camera has a voice output unit when playback is performed;
   a second control unit, responsive to a determination by said determination unit that the camera has said voice output unit, for outputting the voice by the voice data to said voice output unit and halting display of characters represented by the character data; and
   a third control unit, responsive to a determination by said determination unit that the camera does not have said voice output unit, for controlling a display unit so as to display the characters represented by the character data.

2. A digital still camera having an image sensing device for sensing an image of a subject and outputting image data representing the image of the subject, and an image recording controller for recording image data output from the image sensing device, on a recording medium, comprising:
   a voice input unit to enable input of voice and to enable output of voice data representing the voice;
   a voice recording controller to enable recording the voice data output from said voice input unit on the recording medium;
   a character data generating unit to enable generating character data representing the voice data output from said voice input unit;
   a character recording controller to enable recording the character data generated by said character data generating unit on the recording medium;
   a determination unit to enable determining whether the digital still camera has a voice output unit when playback is performed; and
   a control unit, responsive to a determination by said determination unit that the camera has said voice output unit, to enable output of the voice represented by the voice data to said voice output unit and to enable halting display of characters represented by the character data.

3. A digital still camera having an image sensing device for sensing an image of a subject and outputting image data representing the image of the subject, and an image recording controller for recording image data output from the image sensing device, on a recording medium, comprising:
   a voice input unit to enable input of voice and to enable output of voice data representing the voice;
   a voice recording controller to enable recording the voice data output from said voice input unit on the recording medium;
   a character data generating unit to enable generating character data representing the voice data output from said voice input unit;
   a character recording controller to enable recording the character data generated by said character data generating unit on the recording medium;
   a determination unit to enable determining whether the digital still camera has a voice output unit when playback is performed; and
   a control unit, responsive to a determination by said determination unit that the camera does not have said voice output unit, to enable controlling a display unit so as to display characters represented by the character data.

* * * * *